US006488745B2

(12) United States Patent
Gu

(10) Patent No.: US 6,488,745 B2
(45) Date of Patent: Dec. 3, 2002

(54) TRAP APPARATUS AND METHOD FOR CONDENSABLE BY-PRODUCTS OF DEPOSITION REACTIONS

(75) Inventor: Youfan Gu, Superior, CO (US)

(73) Assignee: MKS Instruments, Inc., Andover, MA (US)

( * ) Notice: Subject to any disclaimer, the term of this patent is extended or adjusted under 35 U.S.C. 154(b) by 12 days.

(21) Appl. No.: 09/816,639

(22) Filed: Mar. 23, 2001

(65) Prior Publication Data

US 2002/0134244 A1 Sep. 26, 2002

(51) Int. Cl.[7] .............................................. B01D 45/08
(52) U.S. Cl. ........................ 95/272; 62/55.5; 62/617; 55/434.4; 55/445; 55/446; 55/DIG. 15; 95/288
(58) Field of Search ........................... 95/267, 272, 288; 55/434.2, 434.3, 434.4, 442, 445, 446, DIG. 15; 62/617, 55.5

(56) References Cited

U.S. PATENT DOCUMENTS

| | | | |
|---|---|---|---|
| 1,920,800 A | | 8/1933 | McCausland |
| 2,290,323 A | * | 7/1942 | Graham |
| 2,514,894 A | * | 7/1950 | Naab |
| 2,949,015 A | | 8/1960 | Fite |
| 3,081,068 A | * | 3/1963 | Milleron |
| 3,483,980 A | | 12/1969 | Cochran et al. |
| 3,785,121 A | | 1/1974 | Phelps |
| 3,802,497 A | | 4/1974 | Kümmell et al. |
| 3,865,929 A | | 2/1975 | Ehlig |
| 3,892,550 A | * | 7/1975 | Riis |
| 3,910,347 A | | 10/1975 | Woebcke |
| 3,956,061 A | | 5/1976 | Young et al. |
| 4,374,811 A | | 2/1983 | Karger et al. |
| 4,487,618 A | | 12/1984 | Mann |
| 4,488,887 A | * | 12/1984 | Angel et al. |
| 4,506,513 A | | 3/1985 | Max |
| 4,613,485 A | | 9/1986 | Parry et al. |
| 4,739,787 A | | 4/1988 | Stoltenberg |
| 5,048,601 A | | 9/1991 | Yamaguchi et al. |
| 5,141,714 A | | 8/1992 | Obuchi et al. |
| 5,161,605 A | | 11/1992 | Gutlhuber |

(List continued on next page.)

FOREIGN PATENT DOCUMENTS

| | | |
|---|---|---|
| GB | 556671 | 10/1943 |
| JP | 1218013 | 8/1989 |
| JP | 1318231 | 12/1989 |
| JP | 29408 | 1/1990 |
| JP | 225573 | 1/1990 |
| JP | 259002 | 2/1990 |
| JP | 261067 | 3/1990 |
| JP | 2111403 | 4/1990 |
| JP | 3229609 | 10/1991 |
| JP | 4150903 | 5/1992 |
| SU | 0709182 | 1/1980 |
| SU | 1296231 | 3/1987 |
| SU | 1604428 | 11/1990 |

OTHER PUBLICATIONS

"Foreline Traps", *Nor–Cal Products*, Nor–Cal Products, Inc., May 1990.
"Vacuum Inlet Traps and Oil Mist Eliminators", MV Products, A Division of Mass–Vac, Inc., no date.

*Primary Examiner*—Duane S. Smith
(74) *Attorney, Agent, or Firm*—Faegre & Benson; James R. Young

(57) ABSTRACT

A trap for condensable liquids, such as tantalum pentoxide, has a primary trapping chamber surrounding a secondary trapping chamber and a sump connected by a small enough opening to the primary or secondary chamber such that trapped liquid in the sump is effectively isolated from a gas flow through the primary and secondary chambers. Partitions and openings in the primary and secondary chambers enhance condensation while allowing condensed liquid flow that does not clog the primary and secondary chambers against the gas flow.

31 Claims, 7 Drawing Sheets

U.S. PATENT DOCUMENTS

| | | | |
|---|---|---|---|
| 5,405,445 A | | 4/1995 | Kumada et al. |
| 5,422,081 A | | 6/1995 | Miyagi et al. |
| 5,427,610 A | * | 6/1995 | Croker |
| 5,728,602 A | | 3/1998 | Bellows et al. |
| 5,776,216 A | | 7/1998 | Yang |
| 5,800,616 A | | 9/1998 | Persyn |
| 5,814,377 A | | 9/1998 | Robles et al. |
| 5,817,566 A | | 10/1998 | Jang et al. |
| 5,817,578 A | | 10/1998 | Ogawa |
| 5,820,641 A | | 10/1998 | Gu et al. |
| 5,827,370 A | | 10/1998 | Gu |
| 5,830,279 A | | 11/1998 | Hackenberg |
| 5,833,425 A | | 11/1998 | Jeon et al. |
| 5,834,846 A | | 11/1998 | Shinriki et al. |
| 5,855,651 A | | 1/1999 | Kurita et al. |
| 6,156,107 A | * | 12/2000 | Hayashi et al. |
| 6,176,901 B1 | * | 1/2001 | Scholler |
| 6,206,971 B1 | * | 3/2001 | Umotoy et al. |
| 6,241,793 B1 | * | 6/2001 | Lee et al. |
| 6,258,153 B1 | * | 7/2001 | Hintermaier |
| 6,319,299 B1 | * | 11/2001 | Shih et al. |
| 2001/0003892 A1 | * | 6/2001 | Rikyuu et al. |

* cited by examiner

TO SUMP 11

TRAP APPARATUS AND METHOD FOR CONDENSABLE BY-PRODUCTS OF DEPOSITION REACTIONS

BACKGROUND OF THE INVENTION

1. Field of the Invention

This invention is related generally to liquid-gas separating devices for catching and retaining condensable liquid materials from a flowing gas stream, and more particularly to a trap apparatus and method for removing tantalum pentaethoxide (TAETO) from the exhaust gas flowing out of a reaction/deposition chamber used for depositing thin films of tantalum pentoxide in the fabrication of electronic devices.

2. State of the Art

Tantalum pentoxide ($Ta_2O_5$) is a highly dielectric, electrically insulating, material, which is used extensively in integrated circuits and other semiconductor devices to increase charge storage density, thus to reduce cell areas required for capacitors without reducing capacitance. For example, tantalum pentoxide films are used as storage capacitor dielectric layers in high density integrated circuits, such as DRAM memory chips, and for gate dialectrics for CMOS devices.

Thin films of tantalum pentoxide are usually deposited on desired semiconductor integrated circuit substrates in chemical deposition chambers by well-known chemical vapor deposition (CVD) techniques. For example, tantalum pentaethoxide [$Ta(OC_2H_5)_5$], also known as TAETO, is often used as a precursor material and reacted with oxygen or ozone in a low pressure chemical vapor deposition (LPCVD) reaction chamber to deposit tantalum pentoxide films. Typically, the liquid TAETO is vaporized and delivered into the reaction chamber through a heated, upstream delivery system. The interior of the reaction chamber is also supplied with an atmosphere of oxygen ($O_2$) or ozone ($O_3$) and is often maintained at a relatively high temperature, such as about 450° C., to assist the chemical reaction between the TAETO and the oxygen ($O_2$) or ozone ($O_3$) to produce the desired tantalum pentoxide ($Ta_2O_5$), which deposits as a solid film on a substrate in a reaction chamber. The deposition of the tantalum pentoxide ($Ta_2O_5$) thin film is often followed by an annealing step at about 800° C. in an oxygen atmosphere to enhance the quality of the tantalum pentoxide film.

The primary reaction of TAETO with oxygen ($O_2$) in the reaction chamber to produce tantalum pentoxide ($Ta_2O_5$) is:

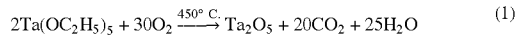
(1)

The primary reaction of TAETO with ozone ($O_3$) in the reaction chamber to produce tantalum pentoxide ($Ta_2O_5$) is:

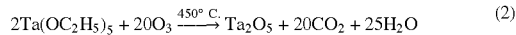
(2)

However, there are also secondary reactions involved in the deposition of $Ta_2O_5$ because of the generation of the water vapor ($H_2O$) byproduct of the reaction in either equation (1) or equation (2) above. In fact, the rate of such secondary chemical reaction between TAETO and water is much higher than the primary chemical reaction (equation (1) or (2)) between TAETO and $O_2$ or $O_3$. Such secondary reaction forms tantalum pentoxide ($Ta_2O_5$) and alcohol, as follows:

(3)

This secondary reaction of equation (3) in a 450° C. reaction chamber proceeds orders of magnitude faster than the primary reaction of either equation (1) or (2), but it proceeds rapidly at ambient (room) temperature as well. Therefore, if any TAETO in the vacuum system downstream from the reaction/deposition chamber has an opportunity to react with water vapor, the resulting solid tantalum pentoxide can damage vacuum system components, such as pumps, valves, and the like.

Only about 10%–20% of the TAETO precursor is consumed in the reaction chamber to produce tantalum pentoxide in order to achieve acceptable, uniform film deposition across a wafer substrate surface. The remainder of the unused TAETO precursor passes along with the carbon dioxide ($CO_2$) and alcohol ($C_2H_5OH$) byproducts out of the reaction chamber and into the pumping foreline, i.e., the pipe leading to the vacuum pump, of the evacuation system. Most, if not virtually all, of the water vapor byproduct of reaction (1) or (2) is consumed in reaction (3), as evidenced by there only being a very small, negligible amount of light, white coating of tantalum pentoxide on the interior wall of the foreline, close to the reaction/deposition chamber exit, in most conventional tantalum pentoxide deposition systems. Therefore, the initial problem from TAETO in the evacuation system is encountered when TAETO condenses, and then problems occur when TAETO reacts with water vapor that back streams into the vacuum system or gets into the vacuum system in another manner, such as during maintenance, to form solid tantalum pentoxide, as explained in more detail below.

First, TAETO will condense in an unheated pumping foreline (a temperature of about 125 to 150° C. is typically required to keep the TAETO from condensing in the foreline), and liquid accumulation in the foreline will affect vacuum pump characteristics and interfere with maintenance of a desired vacuum pressure in the reaction/deposition chamber. Second, when liquid or vapor TAETO is carried into the vacuum pump, the lifetime of the pump can be reduced significantly, especially if solid tantalum pentoxide forms in the pump from reaction of TAETO and any water vapor that gets into the vacuum system. Since most, if not all of the water produced by the initial reaction (equation (1) or (2)) is consumed by the secondary reaction (equation (3)), as explained above, the problems of solid tantalum pentoxide formation and accumulation in the evacuation system, such as in the vacuum pump, valves, regulators, and the like, is usually the result of ambient moisture from the atmosphere, or from wet scrubber equipment that is often installed downstream from the vacuum pump, that back streams into the pump and other components of the vacuum system to combine with TAETO that is exhausted from the reaction/deposition chamber and thereby produces solid tantalum pentoxide in the vacuum system. Also, solid tantalum pentoxide can form very rapidly when either gaseous or liquid TAETO combines with water vapor in ambient air from the atmosphere, which makes maintenance and service of components in the vacuum system very difficult. Solid tantalum pentoxide has to be cleaned mechanically out of pipes and other components of the vacuum system. Further, TAETO is valuable and, if recovered, can be processed and purified, for re-use, e.g., as precursor for tantalum pentoxide deposition.

Conventional traps designed for universal application to remove a variety of solid CVD reaction byproducts are being used to remove TAETO in evacuation systems of tantalum pentoxide CVD reaction chambers. However, such conventional traps have very low trapping efficiency, because trapped liquid also has much higher mobility compared to trapped solid byproducts, or they require too much maintenance and down time when used to trap TAETO because of the rapid reaction with water vapor and resulting solids formation, as described above. Also, such maintenance and down time with such conventional traps is exacerbated, because, as mentioned above, solid tantalum pentoxide, which forms very rapidly when liquid TAETO in such conventional traps is exposed to water vapor in air, has to be cleaned out of such traps mechanically, or the traps would have to be replaced.

SUMMARY OF THE INVENTION

Accordingly, it is a general object of the present invention to provide a more efficient and more effective apparatus and method for trapping and removing condensable liquid products and byproducts from a flow of gas.

A more specific object of this invention is to provide a more efficient and more effective apparatus and method for trapping and removing TAETO from an evacuation system of a tantalum pentoxide CVD or LPCVD reaction chamber.

An even more specific object of this invention is to provide a trapping apparatus and method that is designed especially for the unique trapping and handling problems presented by TAETO, which is exhausted in gaseous form from a CVD or LPCVD reaction/deposition chamber and then condenses into liquid of varying viscosities that are very prone to react with water vapor to form solid tantalum pentoxide.

Additional objects, advantages, and novel features of the invention are set forth in part in the description that follows and will become apparent to those skilled in the art upon examination of the following description and figures or may be learned by practicing the invention. Further, the objects and the advantages of the invention may be realized and attained by means of the instrumentalities and in combinations particularly pointed out in the appended claims.

To achieve the foregoing and other objects and in accordance with the purposes of the present invention, as embodied and broadly described herein, the trapping method of this invention comprises routing a gas stream containing condensable material, such as TAETO, through a tortuous flow path in a vacuum to contact the gas stream with cooled surfaces, which enhance condensation and are configured to accommodate collection and flow of liquid condensate of varying viscosities to a reservoir in a manner that does not clog or interfere with the gas flow and that minimized re-evaporation of the collected liquid condensate back into the gas stream.

To further achieve the foregoing and other objects and in accordance with the purposes of the present invention, as embodied and broadly described herein, the trap apparatus of this invention comprises a primary trap chamber divided by a plurality of vertically spaced apart partitions into a plurality of portions or plenums disposed vertically, one over another, and that are connected together in fluid flow relationship by openings in the partitions. A secondary trap chamber is preferably surrounded by the primary trap chamber in a housing and is connected in fluid flow relationship with the last or lowest of the plurality of portions or plenums of the primary trap chamber. The primary trap chamber is preferably separated from the secondary trap chamber by an inner cylindrical wall, and it is preferably surrounded and enclosed by an outer cylindrical wall. A cooling system removes heat from surfaces in both the primary trap chamber and the secondary trap chamber. The openings in the partitions are preferably misaligned vertically to force a longer flow path and to thereby increase contact of gaseous flow with a surfaces in the primary trap chamber. A small drain opening in an end wall under the primary and secondary chambers is connected to a reservoir, which is separated from the gaseous flow path through the primary and secondary chambers, so that liquid condensate flowing off surfaces in the primary and secondary chambers and collected by the end wall can flow through the small drain opening and into the reservoir for storage remote from the gaseous flow. A valve between the small drain opening and the reservoir is provided to accommodate temporary removal of the reservoir for emptying and cleaning while maintaining the vacuum in the primary and secondary chambers and minimizing, if not preventing, any ambient water vapor from entering the primary and secondary chambers through the small drain opening.

BRIEF DESCRIPTION OF THE DRAWINGS

The accompanying drawings, which are incorporated in and form a part of the specification, illustrate the preferred embodiments of the present invention, and together with the descriptions serve to explain the principles of the invention. In the Drawings

DETAILED DESCRIPTION OF THE INVENTION

Figure 1:
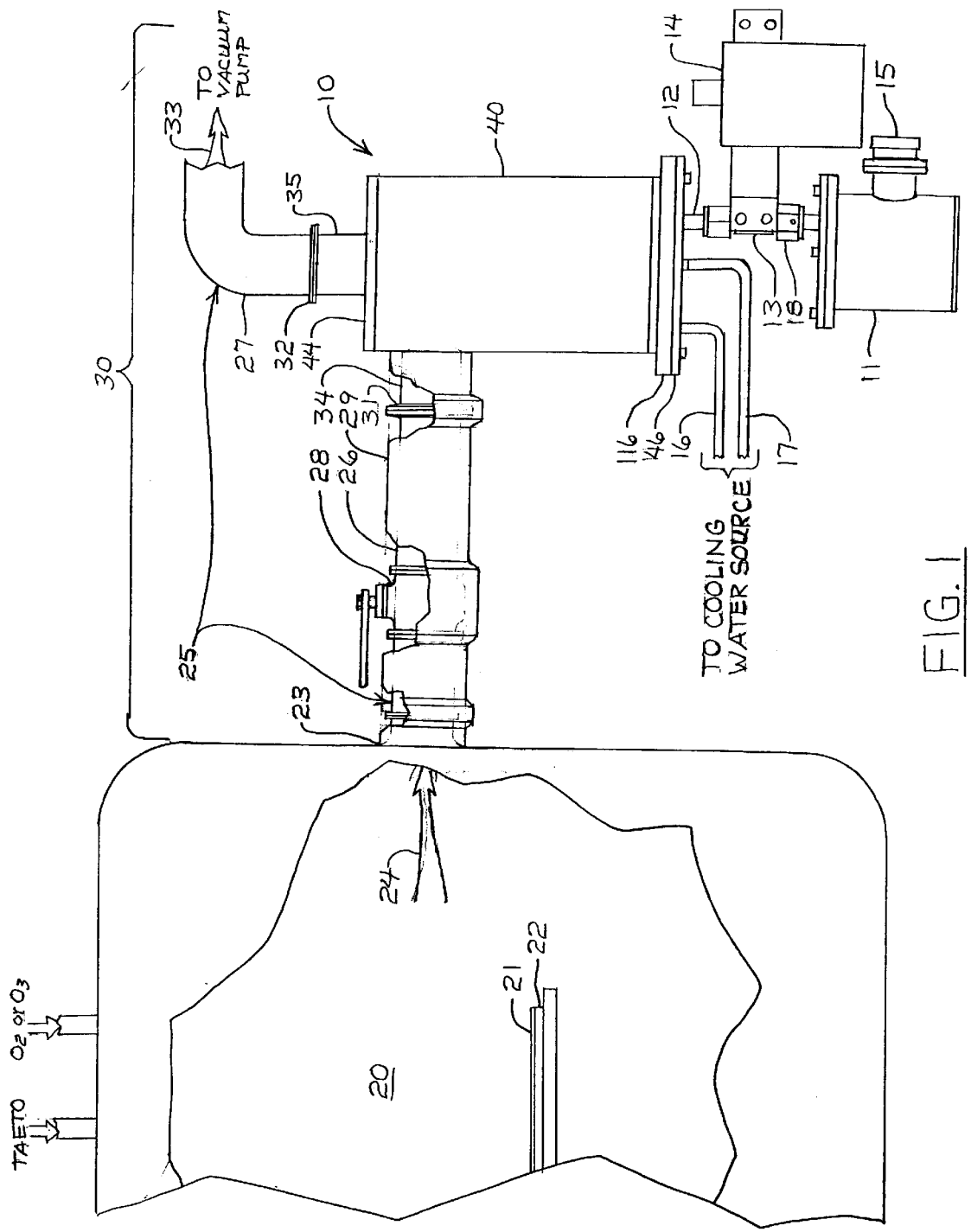
FIG. 1 is a diagrammic view in elevation of a condensable liquid trapping device according to the present invention as positioned in a evacuation system for a tantalum pentoxide CVD reaction chamber.

The trap 10 of the present invention is configured to be especially effective and efficient for capturing and removing a condensable fluid, particularly, but not necessarily limited to, tantalum pentaethoxide, $Ta(OC_2H_5)_5$, i.e., "TAETO", from the exhaust gas of a chemical vapor deposition (CVD) or low pressure chemical vapor deposition (LPCVD) reaction chamber 20 in which solid material, e.g., tantalum pentoxide ($Ta_2O_5$) films 21, are deposited on wafer substrates 22, as illustrated diagrammatically in FIG. 1. Essentially, as is well-known in the art, tantalum pentoxide films can be deposited in a low pressure chemical vapor deposition (LPCVD) process in which TAETO is used as a precursor in either an oxygen ($O_2$) or ozone ($O_3$) atmosphere or carrier gas. The primary reaction of TAETO with oxygen to produce tantalum pentoxide is shown by equation (1) above, or with ozone, as shown by equation (2) above. The secondary reaction, which is at least an order of magnitude faster than the primary reaction, occurs between TAETO and water vapor, $H_2O$, which is one of the byproducts of the primary reaction of equation (1) or (2). As long as there is any $H_2O$ available, TAETO will combine with the $H_2O$ to produce tantalum pentoxide rapidly according to equation (3), especially inside the reaction chamber 20, where the temperature is very high, e.g., about 450° C. While ambient or room temperature reaction between TAETO and water vapor also forms solid tantalum pentoxide quite rapidly, the structures of such ambient temperature tantalum pentoxides are loose and not appropriate for electronic device quality thin films. Therefore, higher temperatures, e.g., about 450° C., are required to achieve reasonable rates of reaction between TAETO and oxygen or ozone (equation (1) or (2)) and between TAETO and water equation (3)) in the reaction chamber 20 as well as to produce high quality tantalum pentoxide films that are suitable for use in electronic devices. However, solid tantalum pentoxides produced at lower temperatures, including ambient or room temperature, are difficult to clean out of pipes and can damage vacuum pumps, clog valves, and cause other problems in vacuum systems 30 downstream from the reaction chamber 20, as will be described in more detail below.

A vacuum system 30 is typically connected to the reaction chamber 20 for evacuating the reaction chamber 20 and maintaining it at a pressure of about 0.4 to 2.0 mmHg during tantalum pentoxide deposition and for removing byproducts of the reaction from the chamber 20. In typical practice, only about 10–20% of the TAETO precursor is consumed in the reaction chamber 20. Most, if not virtually all, of the $H_2O$ byproduct of the initial reaction (equation (1) or (2)) described above usually gets consumed by the secondary reaction (equation 3) in the reaction chamber 20. The remaining 80–90% of the TAETO precursor gets exhausted from the reaction chamber 20 along with the alcohol, $CO_2$, and any remaining $H_2O$ reaction byproducts, as indicated by flow arrow 24, into the vacuum system 30.

The vacuum system 30 usually includes a vacuum pump (not shown) connected to the exhaust port 23 of the reaction chamber 20 by a foreline 25, as is well-known in the art. The trap 10 of the present invention is mounted in the foreline 25, as illustrated diagrammatically in FIG. 1. As mentioned above, the trap 10 is designed especially for capturing and removing the TAETO from the exhaust gas in the foreline 25 and to prevent it from moving farther downstream to cause damage in the vacuum pump (not shown). As also mentioned above, when the TAETO cools, it condenses to a liquid. Therefore, the portion 26 of the foreline 25 that is upstream from the trap 10 is preferably covered by a heating sleeve 29, such as that described in U.S. Pat. No. 5,715,738, issued to D. Hauschulz et al., to maintain the TAETO in the exhaust gas flow 24 at a high enough temperature to prevent the TAETO from condensing until it reaches the trap 10. For example, using the heater sleeve 29 to maintain the upstream portion 26 of the foreline 25 to a temperature in the range of about 125° C. to 150° C. is sufficient to prevent condensation of the TAETO in the upstream portion 26 before it reaches the trap 10. A valve 28 can also be provided in the foreline 25 upstream from the trap 10, if desired, to close and isolate the reaction chamber 20 during removal of the trap 10 for maintenance, repair, or replacement, although such removal is undesirable because it exposes any liquid TAETO in the trap 10 or downstream components with ambient water vapor. Upon exposure to such ambient water vapor, the liquid TAETO reacts with it and forms solid tantalum pentoxide. Since prevention of the formation of such solid tantalum pentoxide in the trap 10 as well as in the rest of the vacuum system 30 is a primary goal of this invention, it is fortunate that such removal or opening of the trap 10 to ambient is rarely necessary, especially when it is equipped with the reservoir or sump 11 according to this invention. The trap 10 can be connected to the upstream portion 26 and to the downstream portion 27 of the foreline 25 by conventional flanged fittings 31, 32, or any other leak-free pipe connection apparatus or method, which is well within the knowledge and the capabilities of persons skilled in the art.

The trap 10 facilitates condensation of substantially all of the TAETO in the gas flow 24 within the housing 40 so that the remaining flow 33 of gaseous byproducts downstream from the trap 10 to the vacuum pump (not shown) is substantially free of TAETO. The sump 11 is preferably connected by a drain line 12 to the housing 40 to catch and hold liquid TAETO in a manner that prevents physical contact between the gas stream 91, 92 flowing through the housing 40 and the liquid TAETO in the sump 11; otherwise, the gas stream 91, 92 flowing over the collected liquid TAETO would re-vaporize and carry downstream significant amounts of the TAETO mist and thereby adversely affect the efficiency of the trap 10. A valve 13 can be provided in the drain line 12 between the housing 40 and the sump 11 to close the drain line 12 before removing the sump 11 for emptying, maintenance, or replacement so that the reaction chamber 20 and vacuum system 30, including the trap 10, can remain isolated from the ambient atmosphere and can even continue to operate during such removal of the sump 11, if desired. The valve 13 can be operated manually, or it can be operated by an actuator 14, such as an electric, vacuum, or pressure solenoid, or any other suitable actuator known to persons skilled in the art. A sight glass 15 can be provided in the sump 11 to accommodate visual inspection to determine when the reservoir in the sump 11 is filled with enough liquid TAETO to require emptying.

The trap 10 is also preferably cooled, for example with water, to accelerate TAETO condensation, as will be described in more detail below. The cooling fluid supply lines 16, 17 can be used to circulate cooling fluid, such as water, through the trap 10.

Figure 2:
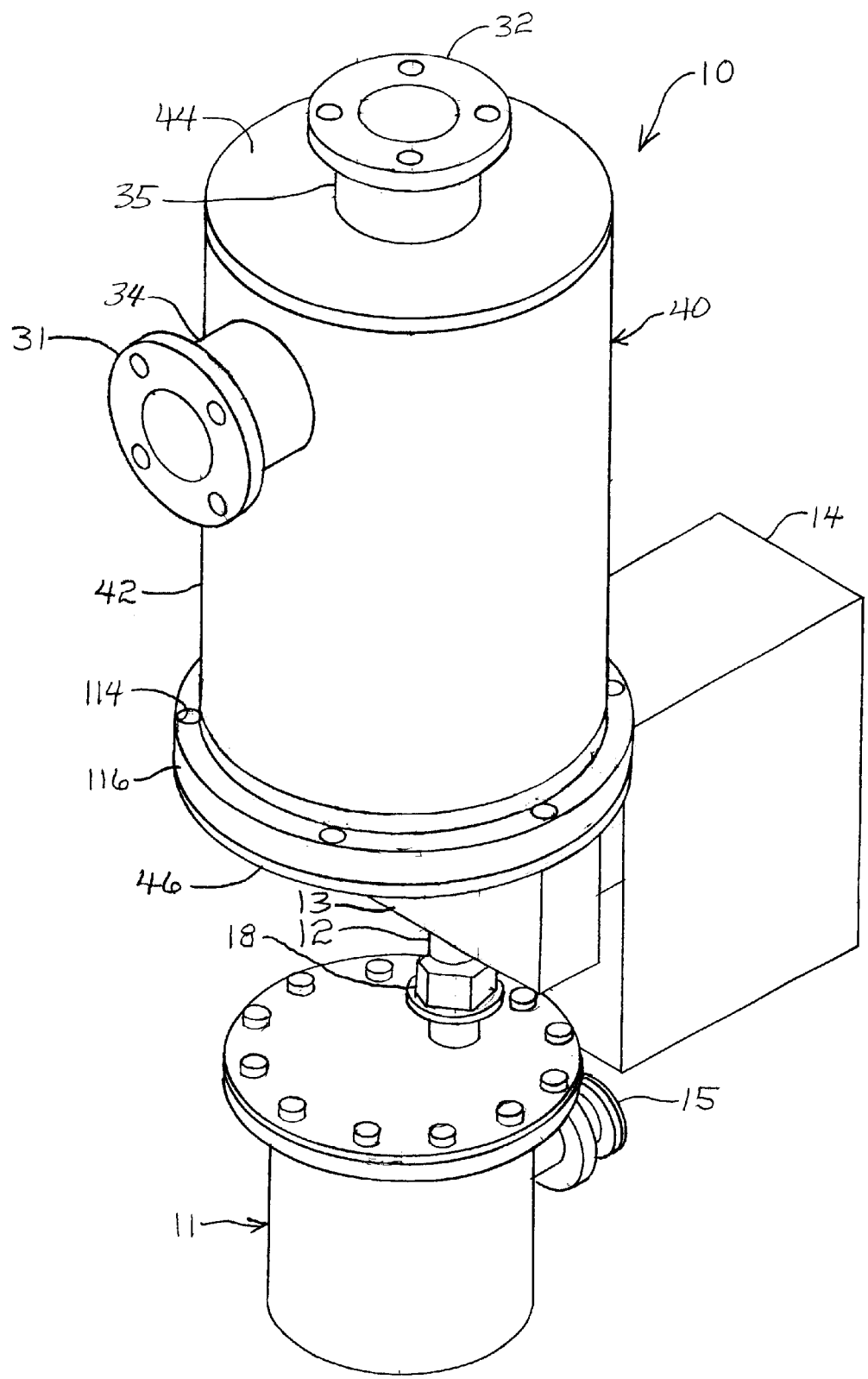
FIG. 2 is an isometric view of a condensable liquid trapping device according to this a invention.
Figure 3:
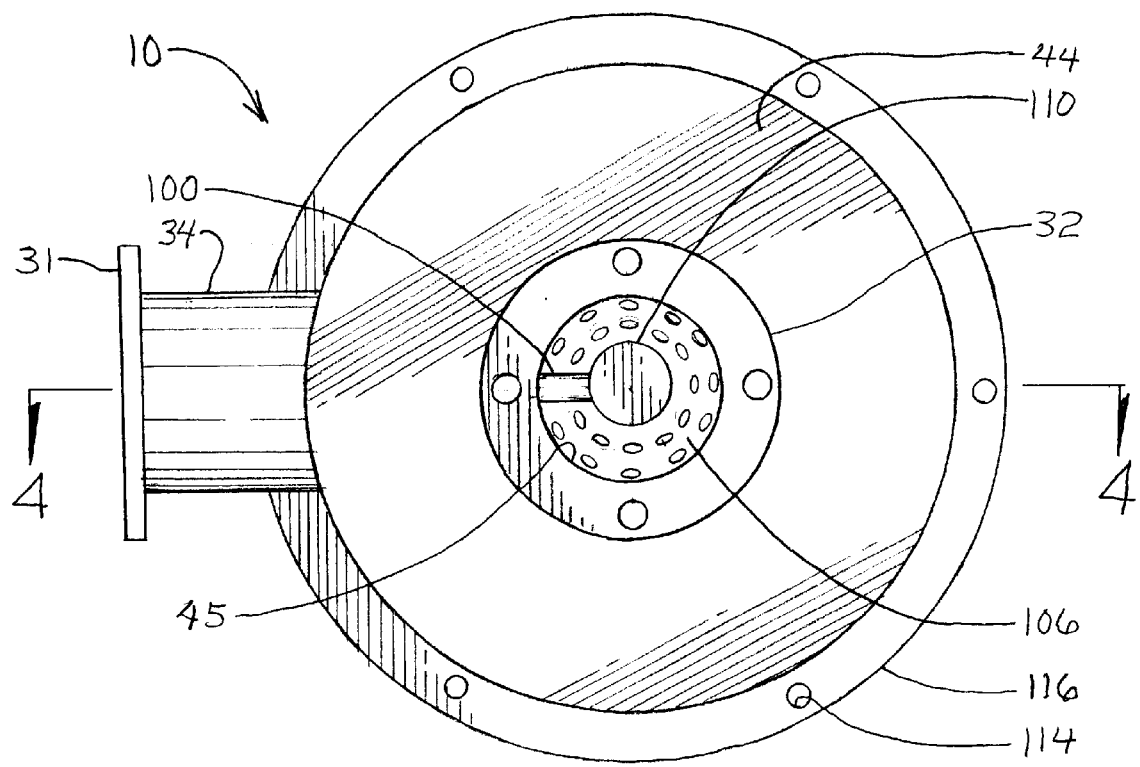
FIG. 3 is a top plan view of the condensable liquid trapping device of FIG. 2.
Figure 4:
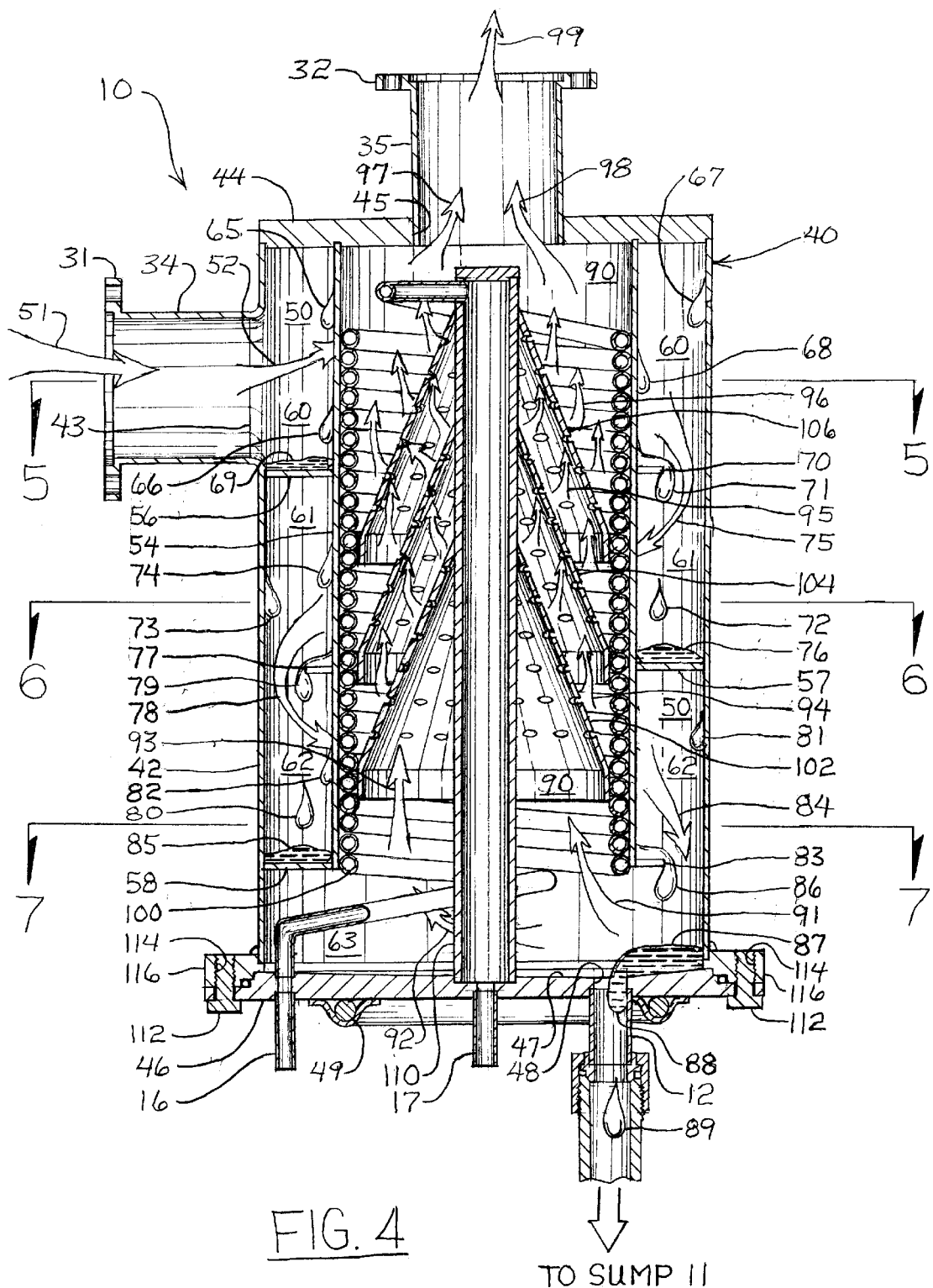
FIG. 4 is a cross-sectional view of the condensable liquid trapping device taken along section line 4—4 of FIG. 3.

Referring now primarily to FIGS. 2–4, the trap 10 preferably has a housing 40, comprising an outer cylindrical wall 42, a top end wall or cap 44, and a bottom end wall or cap 46, that encloses a primary trap chamber 50 and a secondary trap chamber 90. The outer cylindrical wall 42 has an inlet opening 43 to which an inlet fitting 34 is connected to conduct influent comprising the effluent or exhaust gases from the reaction chamber 20 (FIG. 1) into the primary trap chamber 50, as indicated by flow arrows 51, 52 in FIG. 4. The top end wall 44 has an outlet opening 45 to which an outlet fitting 35 is connected to conduct effluent comprising the exhaust gases, but substantially stripped of TAETO, out of the secondary trap chamber 90, as indicated by flow arrows 97, 98, 99.

In the preferred embodiment, trap 10 of FIGS. 2–7, the primary trap chamber 50 is annular and surrounds the secondary trap chamber 90, as best seen in FIGS. 4–7, with an inner cylindrical wall 54 separating the annular primary trap chamber 50 from the secondary trap chamber 90. The primary trap chamber 50 is preferably partitioned into a top portion 60, upper middle portion 61, lower middle portion 62, and bottom portion 63 by vertically spaced apart top partition 56, middle partition 57, and bottom partition 58, although fewer or more partitions and primary trap chamber portions (not shown) may be appropriate in some circumstances, such as when there is more or less TAETO content in the influent or where the physical size of the trap 10 is larger or smaller. However, the arrangement described above is considered to be near optimum for typical tantalum pentoxide deposition chambers and processes.

As the influent 51 bearing, inter alia, TAETO flows into the primary chamber 50, as indicated by flow arrows 51, 52 in FIG. 4, it contacts and is cooled by surfaces, such as outer cylindrical wall 42 and inner cylindrical wall 54 in the top portion 60 of the primary chamber 50. Such cooling causes condensation of TAETO. Such condensed TAETO collects primarily as liquid, which is illustrated diagrammatically in FIG. 4 as drops 65, 66, 67, 68. The TAETO liquid that is condensed in the top portion 60 of the primary chamber 50 is caught by the top partition 56, as illustrated diagrammatically at 69. In the absence of any water vapor in the trap 10, the condensed TAETO 69 remains liquid and eventually runs to the bottom floor 47 of trap 10 and into the sump 11, as will be described in more detail below.

A gap or opening 70 in the top partition 56 allows the gaseous fluid to continue flowing, as indicated by arrow 75, from the top portion 60 of primary chamber 50 into the upper middle portion 61, where TAETO in the gas stream continues to contact, cool, and condense on surfaces, such as the outer cylindrical wall 42 and inner cylindrical wall 54, as indicated diagrammatically by drops 73, 74. Also, condensed TAETO 69 caught on top partition 56 can flow to the gap or opening 70 in the top partition 56, where it can continue flowing, as indicated diagrammatically by drops 71, 72, onto the middle partition 57, where it collects along with TAETO condensed in the upper middle portion 61 of primary chamber 50, as indicated diagrammatically at 76.

A gap or opening 77 in the middle partition 57 allows the gaseous fluid to continue flowing, as indicated by arrow 78, from the upper middle portion 61 of the primary trap chamber 50 into lower middle portion 62 of primary trap chamber 50, where TAETO in the gas stream continues to contact, cool, and condense on surfaces, such as the outer cylindrical wall 42 and the inner cylindrical wall 54, as indicated diagrammatically by drops 81, 82. Also, condensed TAETO 76 caught on middle partition 57 can flow to the gap or opening 77 in the middle partition 57, where it can continue flowing, as indicated diagrammatically by drops 79, 80 onto the bottom partition 58.

Figure 5:
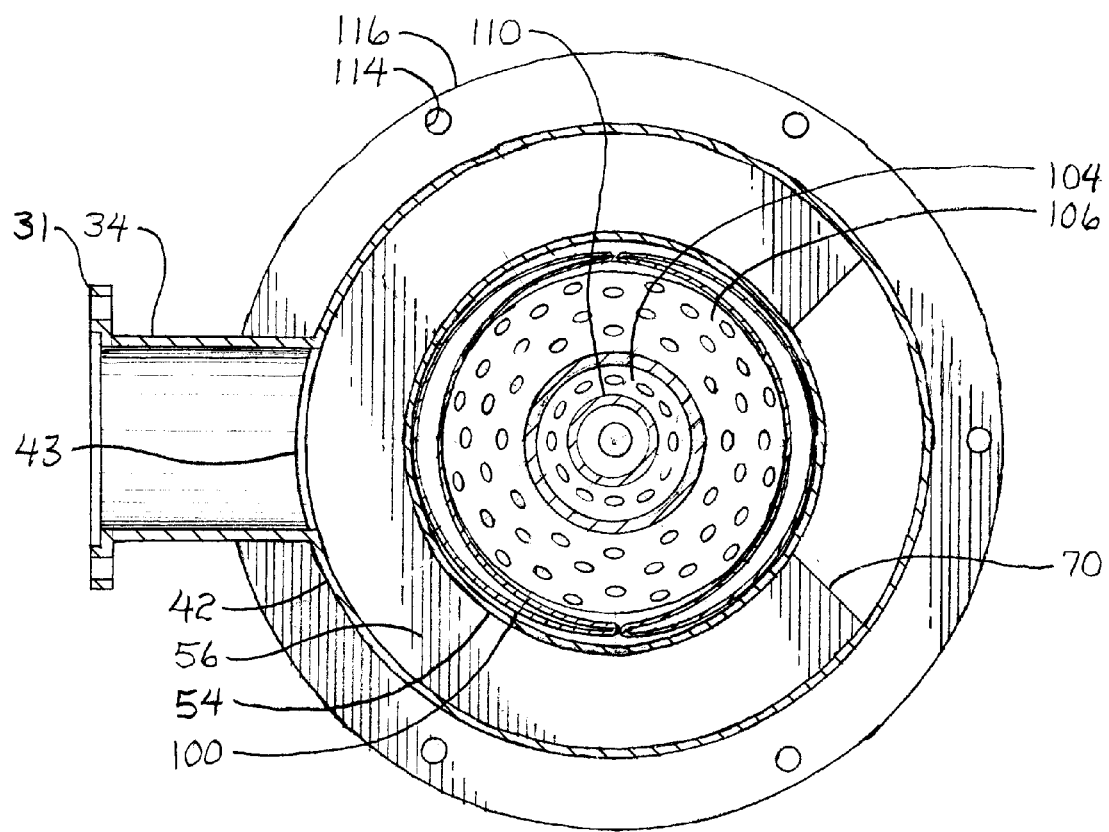
FIG. 5 is a cross-sectional view of the condensable liquid trapping device taken along section line 5–5 of FIG. 4.
Figure 6:
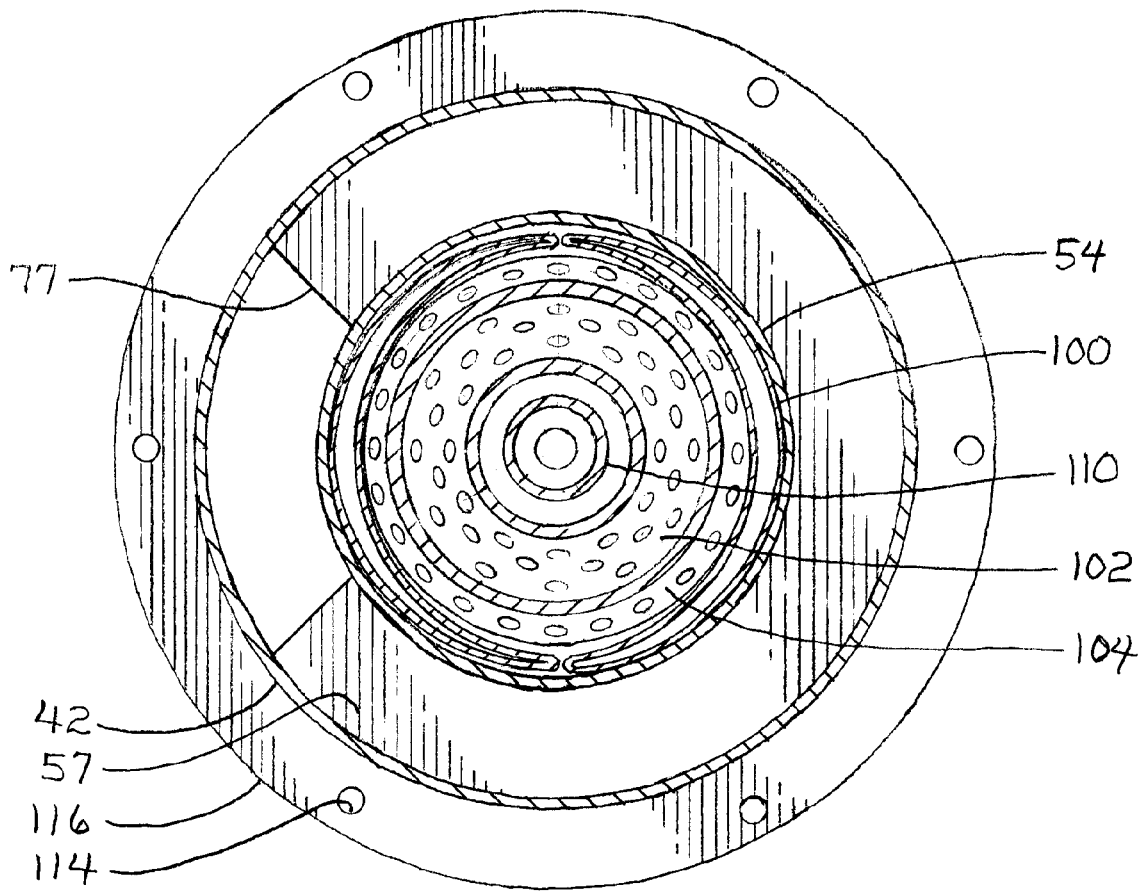
FIG. 6 is a cross-sectional view of the condensable liquid trapping device taken along section line 6–6 of FIG. 4.
Figure 7:
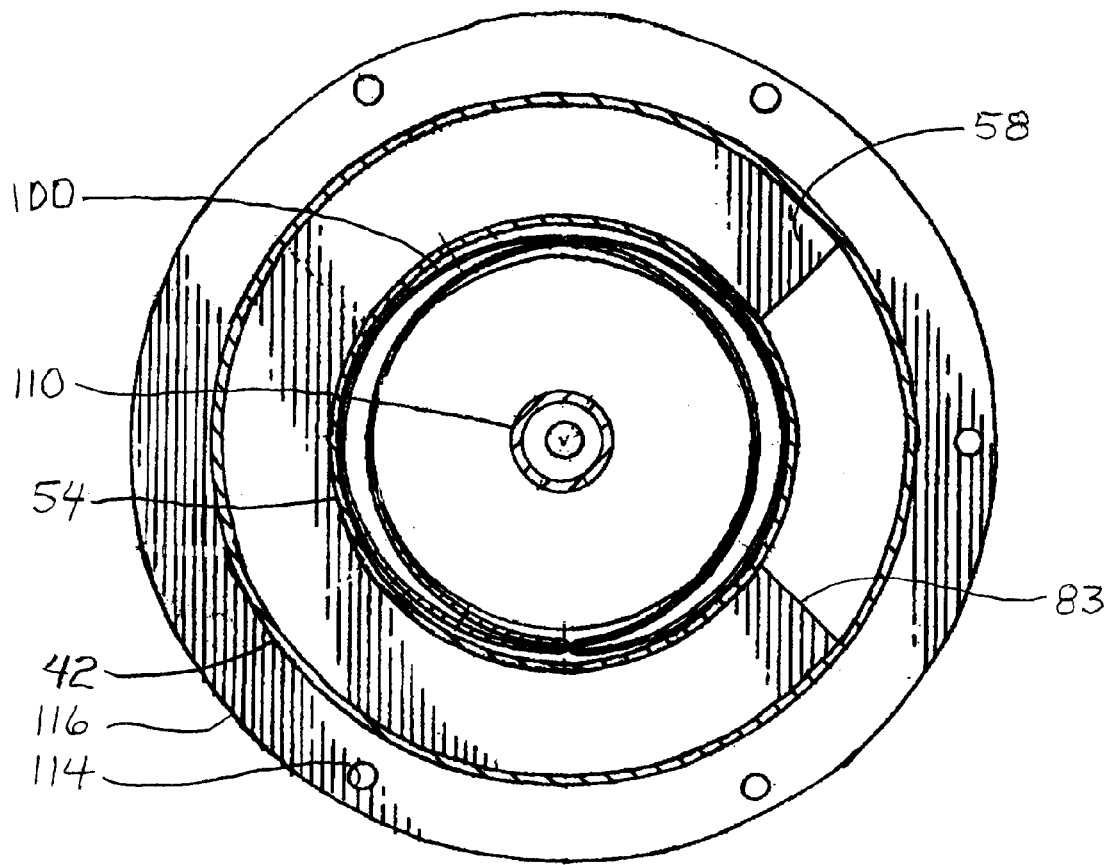
FIG. 7 is a cross-sectional view of the condensable liquid trapping device taken along section line 7–7 of FIG. 4.

The bottom partition 58 also has a gap or opening 83, which allows gaseous flow from the lower middle portion 62 of primary trap chamber 50 into the bottom portion 63, as indicated by arrow 84. By the time the gaseous flow reaches the bottom portion 63 of primary chamber 50, most of the TAETO (preferably at least 90 percent, and more preferably at least 95 percent) has been condensed and removed from the gaseous flow. The gaps or openings 70, 77, 83 in the top, middle, and bottom partitions, respectively, are preferably not all aligned vertically with each other, so that the gaseous flow is forced to flow around the respective top, upper middle, and lower middle portions 60, 61, 62 of the primary trap chamber 50, as indicated by arrows 52, 75, 78, 84, in order to maximize gaseous flow contact with surfaces in the primary trap section, which enhances cooling of TAETO molecules in the gas stream and thereby enhances TAETO condensation efficiency. In fact, it is preferred that the gap or opening 77 in the middle partition 57 is angularly offset by about 180° with respect to the gaps or openings 70, 83 of the top and bottom partitions 56, 58, respectively, to maximize gaseous flow path length, thus surface contact, through the top, an upper middle, and lower middle portions 60, 61, 62, respectively, and thereby maximize condensation and removal of TAETO from the gaseous flow in the primary trap chamber 50. As best seen in FIGS. 5–7, the openings 70, 77, 83 in the partitions 56, 57, 58, respectively, are provided conveniently by angular gaps in the partitions 56, 57, 58. However, any other suitable openings, such as holes (not shown) through partitions 56, 57, 58, could also be used.

The condensed TAETO liquid 85 collected on the bottom partition 58 can also flow to the gap or opening 83 in bottom partition 58, where it can continue flowing, as indicated diagrammatically by drop 86 into the bottom portion 63 of primary trap chamber 50. The floor surface 47 of the bottom end wall or cap 46 is preferably sloped toward a liquid outlet or drainopening 48 through the bottom end cap 46 to enhance quick flow of the collected TAETO condensate 87 out of the primary chamber 50 and via the drain tube 12 to the reservoir ir sump 11. The liquid condensed TAETO 87 can be collected and held in the bottom portion 63, if desired. However, any TAETO liquid that pools on the floor surface 47 would be exposed to, and contacted by, the gas stream flow represented by flow arrow 46, and would tend to form TAETO liquid mist and/or be re-evaporated into the gas stream flow 92, which would adversely affect the TAETO removal efficiency of the trap 10. Therefore, to maximize TAETO trapping and removal efficiency and to increase operating longevity of the trap 10 without disrupting, the tantalum pentoxide deposition process in the CVD reaction chamber 20 (FIG. 1), it is preferable to provide for immediate and continuous removal of condensed liquid TAETO from the bottom portion 63 via drain 12, as indicated by drops 88, 89 (FIG. 4) to a reservoir in a sump 11 (FIG. 1), which is remote from, and not in contact with, the gas stream 91, 92 that flows through the primary chamber Rat 50 and secondary chamber 90 of trap 10. To prevent significant contact between the gas flow 91, 92 and liquid TAETO in the sump 11, it is preferred to make the drain opening 48 in the bottom end cap 46 as small as possible and still allow uninhibited flow of liquid TAETO 87 through the drain opening 48 and/or to position the sump 11 a significant distance from the bottom portion 63 of primary trap chamber 40 For example, the drain opening 48 preferably has a cross sectional area no larger than about 20 cm$^2$, preferably smaller than 10 cm$^2$, and more preferably a hole with a diameter in the range of about 10 to 20 mm, and/or have the sump 11 spaced at least 5 to 20 cm from the bottom portion 63.

The primary trap section, including primary trap chamber 50 with the top, middle, and bottom partitions 56, 57, 58 described above, is configured to provide in a compact package or housing 40 and optimum of surface contact, thus TAETO condensation and removal efficiency, in the primary trap section with enough open space in the, top, upper middle, lower middle, and bottom portions 60, 61, 62, 63 of primary trap chamber 50 to prevent clogging or inhibiting the gaseous flow 52, 75, 78, 84 through the primary trap chamber 50. The efficiency of the TAETO condensation in the primary trap chamber 50 is further enhanced by the cooling system, which preferably includes a coiled tube 100 in the secondary trap chamber 90, but is preferably also in contact with the inner cylindrical wall 54, as shown in FIG. 4, to enhance heat conduction from the inner cylindrical wall 54 and partitions 56, 57, 58 in the primary trap chamber 50. The coiled tube 100 conducts a cooling fluid, for example, water, through the secondary trap chamber 90, as will be described in more detail below, but it also cools, the inner cylindrical wall 54 and partitions 56, 57, 58, which extend radially outward from the inner calendrical wall 54. As mentioned above, this primary trap section configuration is effective to remove as much as 99 percent or more of the TAETO from the gaseous influent, but without any substantive pressure drop or restriction to gaseous flow in the primary trap chamber 50. TAETO will freeze solid at temperatures less than 20° C., so maintaining the cooling water in the coiled tube 100 at about 20° C. will ensure that the trap 10 continues to operate effectively, and the condensed TAETO will continue to flow freely to the drain opening 48. Tests have shown that 96% of the TAETO is condensed and removed from a gas stream in the trap 10, when the cooling water in the cooling tube 100 is maintained at about 20 ° C. However, since the gaseous influent carries heat from the reaction chamber 20 into the trap 10, and the heat exchange between the cooling water and the TAETO is neither perfect nor instantaneously complete, the heat in the influent gas can maintain the condensed TAETO in the primary chamber 50 of trap 10 several degrees warmer than the cooling water. Therefore, TAETO condensation and removal efficiency of the trap 10 can be increased substantially, e.g., to 99%, by maintaining the cooling water flowing through the cooling tube 100 at about 18° C. and still not engender TAETO freezing problems in the primary chamber 30.

Even further efficiency above 99% can be obtained by using even colder cooling water, e.g., 15° C., in the cooling coil 100, but the influent heat may not be sufficient to prevent the condensed TAETO from freezing solid in the trap 10, especially in the bottom portion 63 of the primary chamber 50, where little, if any, of the gas flow 92 still retains any of the influent heat. Therefore, if cooling water temperature less than about 18° C. is used, e.g., about 15° C., it may be necessary to provide a heating system, such as the electric heating coil 49 illustrated in FIG. 4, for use in melting frozen TAETO on the floor surface 47 so that it can continue flowing to the drain hole 48 and out of the primary chamber 50. Constant application of heat from the heating system 47 would, of course, be counterproductive to the increased condensation efficiencies obtained by using colder cooling fluid, but intermittent application of such heat, for example, once or twice per month, to melt accumulated frozen TAETO on the floor surface 47 and elsewhere in the trap 10, may be sufficient to keep the trap 10 operating at peak efficiency.

With at least 90 percent, and preferably as much as 95 percent or more, of the TAETO removed from the gaseous flow in the primary trap section, as described above, the remaining TAETO in the gas flow 91, 92, 93 can be scrubbed in a secondary trap section, including a secondary chamber 90, in which the gaseous flow is directed through a more dense configuration of gas dispersal and cooling surfaces without clogging or substantive pressure drop. Therefore, the preferred secondary trap section of trap 10 includes a plurality of perforated conical baffles 102, 104, 106 spaced apart in longitudinal relationship to each other in the secondary trap chamber 90, as best seen in FIG. 4. The perforated baffles 102, 104, 106 are surrounded by, and in contact with, the coiled cooling tube 100. The baffles 102, 104, 106 are also in contact with a central cooling conduit 110, which is connected to the cooling tube 100 and forms part of the cooling system. Therefore, the gaseous flow from the primary trap chamber 50 into the secondary trap chamber 90, as indicated by arrows 91, 92, 93 in FIG. 4, is dispersed widely by the perforations in the conical baffles 102, 104, 106, as indicated by flow arrows 94, 95, 96, into intimate contact with broad, cooled surfaces of the baffles 102, 104, 106, as well as with the surfaces of the coiled cooling tube 100 and the central cooling conduit 110, to maximize contact and heat exchange between the gaseous flow and these surfaces. Such contact and heat exchange is effective to scrub the remaining 5 to 10 percent of the TAETO out of the gaseous flow, leaving only about 1 to 2 percent of the TAETO, which is negligible, or even less than 1 percent, if colder cooling water is used, as described above. Since only about 5 to 10 percent of the TAETO or less has to be captured and removed by the secondary trap section described above, the liquid quantity of condensed TAETO in the secondary trap chamber 90 is very small and does not clog the perforated baffles 102, 104, 106 or other gas passages in the secondary trap chamber 90. Any small amounts of such liquid condensed TAETO that does collect in the secondary trap chamber 90 can flow through the perforations in the baffles 102, 104, 106 and fall into the bottom portion 63 of the primary trap chamber 50 and, from there, drain with the liquid TAETO 87 out of the primary trap chamber 50 to the sump 11 (FIG. 1), as explained above. The effluent gaseous flow 97, 98, stripped of virtually all, e.g., about 99 percent or more, of the TAETO, flows out of the trap 10 through the outlet fitting 35 to the vacuum pump (not shown).

As mentioned above, when it is determined that the sump 11 (FIGS. 1 and 2) is full and needs to be emptied, the valve 13 can be closed, and the sump 11 can be detached at pipe fitting 18 from the rest of the trap 10. With the valve 13 closed, the vacuum in the housing 40 of the trap 10 can be maintained and operation of the tantalum pentoxide reaction/disposition chamber 20 can continue uninterrupted. During such continued operation with the valve 13 closed and the sump 11 detached, the liquid condensed TAETO can be allowed to accumulate in the bottom portion 63 (FIG. 4) for a short time. Therefore, the tantalum pentoxide deposition process in the CVD reaction chamber 20 (FIG. 1) can continue uninterrupted, while the sump 11 is detached, emptied, and cleaned. The condensed TAETO emptied from the sump 11 does not have the necessary purity for immediate reuse as a precursor in the tantalum pentoxide deposition process, but it is very valuable and can be re-processed to recover the TAETO for subsequent reuse as precursor in a reaction chamber, as is known to persons skilled in the art, and which is not a part of this invention. When the sump 11 is re-attached to the drain line 12 of trap 10, the valve 13 can be re-opened so that any accumulated TAETO in the bottom portion 63 (FIG. 4) can drain into the sump 11, and the operation of the CVD reaction chamber 20 can continue without interruption or down time.

Eventually, it may be necessary to disassemble and clean the trap 10. In spite of efforts to keep ambient water vapor out of the trap 10, small amounts of solid, amorphous tantalum pentoxide may accumulate over time on the partitions 56, 57, 58 or on the baffles 102, 104, 106 due to small amounts of water vapor in the gas flow from the reaction chamber, or, more likely, from water vapor back streaming into the trap 10. To disassemble the trap 10, the bolts 112 can be removed from the holes 114 in the peripheral rim 116 at the bottom of the outer cylindrical wall 42, so that the bottom end cap 46 can be removed from the rest of the housing 40. Then the secondary trap assembly comprising the coiled tube 100, central cooling conduit 110, and perforated baffles 102, 104, 106 can be pulled out of the secondary trap chamber 80. The primary trap assembly comprising the partitions 56, 57, 58, which are attached (e.g., welded) to the inner cylindrical wall 54, can be pulled out of the outer cylindrical wall 42.

While it is preferred for compactness and spatial efficiency to have the primary trap chamber 50 surround the secondary trap chamber 90, as described above, variations from this configuration would also work. For example, while such variations are not illustrated in the drawings, it is apparent, once the functional and structural features of this invention are understood from the description above, that the primary trap chamber 50 could only partially surround the secondary trap chamber 90, or the primary trap chamber 50 could be positioned above, below, or along side the secondary trap chamber 90, as long as a fluid flow connection is provided between the bottom portion 63 of the primary trap chamber 50 and the secondary trap chamber 90.

As another variation, any or all of the partitions 56, 57, 58 could be slanted, instead of horizontal, to form a helix or partial helix around the inner cylindrical wall 54.

As still other variations, the baffles 102, 104, 106 could also be flat or horizontal, or they could be hemispherical or bulbous, instead of conical, or they could be formed by one or more helixes. Also, instead of having perforated surfaces, the baffles 102, 104, 106 could be formed with screen or mesh to disperse the gaseous flow and to enhance surface contact with the gaseous flow in the secondary trap chamber 90.

It would also be a suitable variation to position the gas flow inlet opening 43 into the primary chamber 50 through the top end wall 44, instead of through the outer cylindrical wall 42. Likewise, instead of extending the outlet through the upper end wall 44, as shown in FIG. 4, an outlet opening out of the secondary chamber 90 could be routed by a tube or openings and partitions (not shown) from the secondary chamber 90, through the inner cylindrical wall 54, through the primary chamber 50, and through the outer cylindrical wall 42. Further, the inner cylindrical wall 54 could extend all the way to the bottom wall 46, and one or more opening(s) could be provided through such extended cylindrical wall to accommodate gas flow from the primary chamber 50 into the secondary chamber 90 and to accommodate TAETO condensate flow to the drain 48.

Since these and numerous other modifications and combinations of the above-described methods and structures will readily occur to those skilled in the art, it is not desired to limit the invention to the exact construction and process shown and described above. For example, Accordingly, resort may be made to all suitable modifications and equivalents that fall within the scope of the invention as defined by the claims which follow. The words "comprise," "comprises," "comprising," "include," "including," and "includes" when used in this specification and in the following claims are intended to specify the presence of stated features or steps, but they do not preclude the presence or addition of one or more other features, steps, or groups thereof. Unless denoted otherwise, the word "about" when used in relation to condensation efficiency means plus or minus 1.0%, when used in relation to temperature means plus or minus 1.0° C., when used in relation to cross-sectional area means plus or minus 1.0 cm².

The embodiments of the invention in which an exclusive property or privilege is claimed are defined as follows:

1. Trap apparatus, comprising:
    a primary trap section connected in fluid flow relationship to a secondary trap section;
    said primary trap section including: (i) a primary trap chamber with a top portion, a middle portion, and a bottom portion; (ii) an inlet into the top portion; (iii) a top partition separating the top portion and the middle portion, said top partition having an opening that allows fluid flow from the top portion to the middle portion; and (iv) a bottom partition separating the middle portion from the bottom portion, said bottom partition having an opening that allows fluid flow from the middle portion to the bottom portion;
    said bottom portion being connected in fluid flow relationship to said secondary trap section; and
    said secondary trap section having a secondary trap chamber, an outlet, and flow dispersing surfaces positioned in the secondary trap chamber between the bottom portion of the primary trap chamber and the outlet.

2. The trap apparatus of claim 1, including a middle partition in the middle portion of the primary trap chamber that divides the middle portion into an upper middle portion and a lower middle portion, said middle partition having an opening that allows fluid flow from the upper middle portion to the lower middle portion.

3. The trap apparatus of claim 2, wherein the openings in the top, middle, and bottom partitions are positioned in vertical misalignment such that fluid cannot flow in a single vertical path from the top portion of the primary trap chamber to the bottom portion of the primary trap chamber.

4. The trap apparatus of claim 1, wherein the primary trap section surrounds the secondary trap section.

5. The trap apparatus of claim 1, including cooling surfaces positioned in the secondary trap chamber between the transition fluid flow path and the outlet in a manner that causes fluid flow through the secondary trap chamber from the transition fluid flow path to the outlet to be tortuous.

6. The trap apparatus of claim 5, including a cooling system in the secondary trap section connected to the cooling surfaces for transferring heat away from the cooling surfaces.

7. The trap apparatus of claim 6, including a plurality of perforated conical baffles positioned in vertically spaced apart relation to each other in the secondary trap section to form the cooling surfaces.

8. The trap apparatus of claim 6, wherein the cooling system includes at least one coolant tube in contact with the cooling surfaces, said tube being connectable to a source of cooling fluid and adapted to conduct a flow of such cooling fluid.

9. The trap apparatus of claim 8, wherein the primary trap section surrounds the secondary trap section and a cylindrical inner wall separates the primary trap section from the secondary trap section.

10. The trap apparatus of claim 9, wherein the coolant tube is in contact with both the cylindrical inner wall and the cooling surfaces.

11. The trap apparatus of claim 10, wherein the top partition and the bottom partition are connected to, and extend radially outwardly from, the cylindrical inner wall.

12. The trap apparatus of claim 11, including a middle partition in the middle portion of the primary trap chamber, said middle partition being connected to, and extending radially outward from, the calendrical inner wall to divide the middle portion into an upper middle portion and a lower middle portion, and said middle shelf having an opening that allows fluid flow from the upper middle portion to the lower middle portion.

13. The trap apparatus of claim 12, including an outer calendrical wall surrounding the primary trap section.

14. The trap apparatus of claim 13, wherein the top partition, the middle partition, and the bottom partition each extend from the inner cylindrical wall radially outward to the outer cylindrical wall.

15. The trap apparatus of claim 14, wherein the opening in the top partition is defined by an angular gap in the top partition, the opening in the middle partition is defined by an angular gap in the middle partition, and the opening in the bottom partition is defined by an angular gap in the bottom partition.

16. The trap apparatus of claim 14, including a housing enclosing the primary trap section and the secondary trap section, said housing including the outer cylindrical wall and including a top end wall and a bottom end wall, wherein the outer cylindrical wall and the inner cylindrical wall both abut the top end and the outer cylindrical wall abuts the bottom end wall.

17. The trap apparatus of claim 16, wherein the outer cylindrical wall has an inlet aperture that forms the inlet into the top portion of the primary trap chamber.

18. The trap apparatus of claim 16, wherein the top end wall has an outlet aperture that forms the outlet of the secondary trap chamber.

19. The trap apparatus of claim 16, wherein the bottom end wall has a drain hole extending through the bottom end wall.

20. The trap apparatus of claim 19, including a sump connected to the drain hole in bottom end wall.

21. The trap apparatus of claim 19, wherein the drain hole has a cross sectional area less than 20 cm$^2$.

22. The trap apparatus of claim 21, wherein the drain hole has a cross-sectional area less than 10 cm$^2$.

23. The trap apparatus of claim 19, wherein the drain hole has a diameter in a range of 10 to 20 mm.

24. The trap apparatus of claim 20, wherein the sump has a reservoir that is separated by at least 5 cm from the primary trap chamber by a conduit that has a diameter less than 20 mm.

25. The trap apparatus of claim 20, including a valve between the drain hole and the sump and a detachable connection between the valve and the sump.

26. The trap apparatus of claim 19, wherein the bottom end wall has a floor surface that is sloped toward the drain hole.

27. The trap apparatus of claim 26, including a heater adjacent the bottom end wall.

28. The trap apparatus of claim 27, wherein the heater is operable intermittently.

29. Trap apparatus for condensing and removing TAETO from a stream of gaseous effluent from a tantalum pentoxide deposition/reaction chamber, comprising:

a housing with a top end and a bottom end comprising an outer cylindrical wall, and a top end wall, and a bottom end wall, which together enclose an annular primary chamber surrounding a secondary chamber, said annular primary chamber and said secondary chamber being separated by an inner cylindrical wall that extends more than half way from the top end wall toward the bottom end wall such that there is a gap between the inner cylindrical wall and the bottom end wall, said housing having an inlet opening into the top of the primary chamber and an outlet opening out of the top of the secondary chamber so that a stream of gaseous effluent flowing through the inlet opening into the primary chamber and out of the secondary chamber through the outlet opening has to flow downwardly through the primary chamber, radially inward through the gap between the inner cylindrical wall and the bottom end wall, and upwardly through the secondary chamber to the outlet opening;

a plurality of condensation surfaces positioned in the primary chamber;

a sump positioned below the bottom end wall and connected by a tube to a drain hole in the bottom end, said drain hole having a cross-sectional area that is less than about 20 cm$^2$;

a valve positioned in the tube between the drain hole and the sump; and a detachable connection between the valve and the sump.

30. A method of trapping and removing TAETO from a stream of effluent gas from a tantalum pentoxide reaction/deposition chamber, comprising:

flowing the effluent gas through a chamber that has a plurality of partitions, which are spaced apart from each other in a manner that imposes a tortuous flow path on the effluent gas and enhances contact between the effluent gas and the partitions;

cooling the partitions to enhance heat transfer from the effluent gas to the partitions enough to condense TAETO from the effluent gas on the partitions; and collecting TAETO condensate formed on the partitions into a sump that is separated from the effluent gas stream flowing through the chamber by flowing the TAETO condensate through a drain hole in a wall that is positioned between the effluent gas stream and the sump.

31. The method of claim 30, wherein the drain hole has a cross-sectional area of less than 20 cm$^2$.

* * * * *